(12) United States Patent
Hu et al.

(10) Patent No.: US 11,637,668 B2
(45) Date of Patent: Apr. 25, 2023

(54) NARROWBAND POSITIONING REFERENCE SIGNAL TRANSMISSION METHOD, APPARATUS, AND DEVICE, AND STORAGE MEDIUM

(71) Applicant: ZTE CORPORATION, Guangdong (CN)

(72) Inventors: Youjun Hu, Guangdong (CN); Bo Dai, Guangdong (CN); Huiying Fang, Guangdong (CN); Kun Liu, Guangdong (CN); Weiwei Yang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 65 days.

(21) Appl. No.: 17/054,329

(22) PCT Filed: May 13, 2019

(86) PCT No.: PCT/CN2019/086686
§ 371 (c)(1),
(2) Date: Nov. 10, 2020

(87) PCT Pub. No.: WO2019/214746
PCT Pub. Date: Nov. 14, 2019

(65) Prior Publication Data
US 2021/0167913 A1    Jun. 3, 2021

(30) Foreign Application Priority Data

May 11, 2018   (CN) .......................... 201810451194.5

(51) Int. Cl.
*H04L 27/26*   (2006.01)
*H04L 5/00*   (2006.01)
(Continued)

(52) U.S. Cl.
CPC ........ *H04L 5/0048* (2013.01); *H04L 27/2613* (2013.01); *H04W 72/0466* (2013.01)

(58) Field of Classification Search
CPC .... H04J 11/005; H04L 27/261; H04L 5/0048; H04W 72/0466
See application file for complete search history.

(56) References Cited

U.S. PATENT DOCUMENTS

| | | | |
|---|---|---|---|
| 2014/0171097 A1* | 6/2014 | Fischer | ................. H04W 64/00 |
| | | | 455/456.1 |
| 2016/0366687 A1 | 12/2016 | Guo et al. | |
| 2018/0217228 A1* | 8/2018 | Edge | ..................... H04W 64/00 |

FOREIGN PATENT DOCUMENTS

| | | |
|---|---|---|
| CN | 106537802 A | 3/2017 |
| CN | 107409286 A | 11/2017 |

(Continued)

OTHER PUBLICATIONS

International Search Report for Application No. PCT/CN2019/086686, dated Aug. 14, 2019, 2 pages.
(Continued)

*Primary Examiner* — Melvin C Marcelo
*Assistant Examiner* — Natali Pascual Peguero
(74) *Attorney, Agent, or Firm* — KDW Firm PLLC

(57) ABSTRACT

Provided are a signal transmission method, apparatus, and device, and a storage medium. The method includes generating a second narrowband positioning reference signal sequence according to a system frame number (SFN); obtaining a second narrowband positioning reference signal according to the second narrowband positioning reference signal sequence; and transmitting a first narrowband positioning reference signal on a first radio frame set, and transmitting the second narrowband positioning reference signal on a second radio frame set.

10 Claims, 2 Drawing Sheets

First *M* radio frames are compatible

(51) Int. Cl.
*H04W 72/04* (2009.01)
*H04W 72/044* (2023.01)

(56) References Cited

FOREIGN PATENT DOCUMENTS

| CN | 109792361 A | 5/2019 |
|---|---|---|
| WO | 2018030681 A1 | 2/2018 |
| WO | 2018030847 A1 | 2/2018 |
| WO | 2018030848 A1 | 2/2018 |

OTHER PUBLICATIONS

Ericsson., "On NPRS performance" 3GPP TSG-RAN WG1#92bis, Sanya, China, Apr. 16-20, 2018—R1-1804167, 7 pages.
Huawei, HiSilicon, "Draft CR on search space definition for LAA DL partial subframes in 36.213" 3GPP TSG-RAN WG1 Meeting #84bis—Busan, Korea Apr. 11-15, 2016—R1-162135, 3 pages.
Huawei, HiSilicon., "Design of downlink positioning reference signal for NB-IoT" 3GPP TSG RAN WG1 Meeting #87—Reno, USA, Nov. 14-18, 2016—R1-1611143, 4 pages.
Huawei, HiSilicon., "Way forward on NPRS sequence generation" 3GPP TSG RAN WG1 Meeting #87—Reno, Nevada, Nov. 14-18, 2016—R1-1613214, 3 pages.
Qualcomm., "On NPRS performance" 3GPP TSG RAN WG1 Meeting #92—Athens, Greece, Feb. 26-Mar. 2, 2018—R1-1802300, 5 pages.
Author Unknown., "Narrowband physical downlink shared channel" 3GPP TS 36 211 V14.4.0 (Sep. 2017) Release 14, 11 pages.
Search Report for the Chinese Application No. 2018104511945, dated Sep. 17, 2021, 1 page.
Office Action for the Chinese Application No. 2018104511945, dated Sep. 17, 2021, 8 pages.
European Search Report for European Application No. EP 19799993, dated Jan. 10, 2022, 6 pages.

\* cited by examiner

NARROWBAND POSITIONING REFERENCE SIGNAL TRANSMISSION METHOD, APPARATUS, AND DEVICE, AND STORAGE MEDIUM

CROSS-REFERENCE TO RELATED APPLICATIONS

This application is a national stage application filed under 35 U.S.C. 371 based on International Patent Application No. PCT/CN2019/086686, filed on May 13, 2019, which claims priority to Chinese Patent Application No. 201810451194.5 filed with the CNIPA on May 11, 2018, the disclosures of which are incorporated herein by reference in their entireties.

TECHNICAL FIELD

The present disclosure relates to the field of communications and, in particular, to a signal transmission method, apparatus, and device, and a storage medium.

BACKGROUND

Narrow Band Internet of Things (NB-IoT) based on a cellular network is an important branch used for establishing the Internet of Everything network. Three deployment manners such as in-band, guard-band and stand-alone carriers may be used. The NB-IoT based on the cellular network has the advantages such as wide coverage, multiple connections, low cost and low power consumption, and can coexist with existing networks so that deployment costs are reduced and a smooth upgrade is achieved.

Currently, users or terminals have a wide range of positioning requirements. Based on the NB-IoT positioning technology, not only the positioning function can be achieved, but also the power consumption of a terminal device can be reduced. Narrowband positioning reference signals (NPRSs) in NB-IoT and positioning reference signals (PRSs) in Long Term Evolution (LTE) adopt the same design. NPRSs of different radio frames only have repetitive gains in the time domain, and in the in-band mode, the sequence length of each radio frame that can be used for transmitting NPRSs is greatly reduced. The reduction of the sequence length may directly affect the estimation accuracy of the arrival time, and thus may affect the positioning accuracy. Further, the interference generated by the neighbor cell cannot be eliminated, thereby causing performance degradation.

Based on this, the sequence design of NPRSs still needs more effective improvement.

SUMMARY

Embodiments of the present disclosure provide a signal transmission method, apparatus, and device, and a storage medium so that the problem of relatively low positioning performance of NB-IoT.

Embodiments of the present disclosure provide a signal transmission method. The method includes the steps described below.

A second narrowband positioning reference signal sequence is generated according to a system frame number (SFN).

A second narrowband positioning reference signal is obtained according to the second narrowband positioning reference signal sequence.

A first narrowband positioning reference signal is transmitted on a first radio frame set, and the second narrowband positioning reference signal is transmitted on a second radio frame set.

Embodiments of the present disclosure provide a signal transmission apparatus. The apparatus includes an adjustment module, a generation module and a transmission module.

The adjustment module is configured to generate a second narrowband positioning reference signal sequence according to an SFN.

The generation module is configured to obtain a second narrowband positioning reference signal according to the second narrowband positioning reference signal sequence.

The transmission module is configured to transmit a first narrowband positioning reference signal on a first radio frame set, and transmit the second narrowband positioning reference signal on a second radio frame set.

Embodiments of the present disclosure further provide a signal transmission device including a memory and a processor. The memory is configured to store a computer program. The processor executes the computer program to perform the steps of the preceding method.

Embodiments of the present disclosure further provide a computer-readable storage medium, storing a computer program about signal transmission. The computer program is configured to, when executed by at least one processor, cause the at least one processor to perform the steps of the preceding method.

In embodiments of the present disclosure, a first narrowband positioning reference signal is transmitted on a first radio frame set, and a second narrowband positioning reference signal is transmitted on a second radio frame set. In this manner, the length of the NPRS base sequence can be increased, and the impact of NPRS conflicts between cells can be reduced, thereby effectively improving the positioning performance.

DETAILED DESCRIPTION

Figure 1:
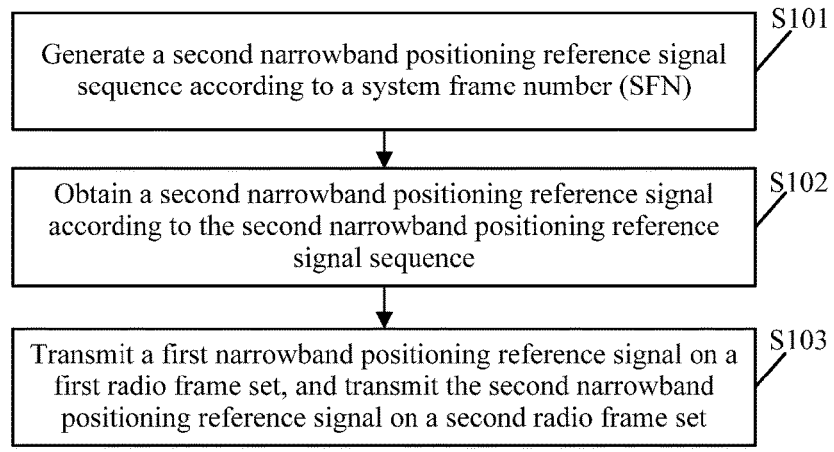
FIG. 1 is a flowchart of a signal transmission method according to an embodiment of the present disclosure.

The present disclosure provides a signal transmission method, apparatus, and device, and a storage medium. The present disclosure is further described below in detail in conjunction with the drawings and embodiments. It is to be understood that embodiments described herein are intended to explain the present disclosure, and not to limit the present disclosure.

Suffixes such as "module", "part" or "unit" used to indicate elements in the subsequent description are merely used to facilitate the description of the present disclosure, and have no particular meaning in themselves. Therefore, "module", "part" or "unit" may be used in a mixed manner.

Prefixes such as "first" and "second" used to distinguish elements are merely used to facilitate the description of the present disclosure, and have no particular meaning in themselves.

Embodiment One

The positioning solution based on NB-IoT may be transmitting a narrowband positioning reference signal on an orthogonal frequency-division multiplexing (OFDM) symbol with a port number of 2006, a subcarrier spacing of Δf=15 kHz and a normal cyclic prefix (CP), performing related detection on the reference sequences of multiple evolved Node Bs (eNBs) by using a terminal to obtain the arrival time difference, and thus performing positioning. The reference sequence $r_{l,n_s}(m)$ of a NPRS is described below.

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1.$$

$n_s$ denotes a slot number in one radio frame, and the value range of $n_s$ is 0-19; denotes an OFDM symbol number in one time slot, and the value range of 1 is 0-6; and $N_{RB}^{max,DL}$ denotes the number of resource blocks (RBs) under the maximum downlink bandwidth, and the maximum may be 110. The initialization value of a pseudo random sequence c( ) (that is the second initialization value of the first pseudo random sequence in embodiments of the present disclosure) is described below.

$$c_{init}=2^{28} \cdot \lfloor N_{ID}^{NPRS}/512 \rfloor + 2^{10} \cdot (7 \cdot (n_s+1)+l+1) \cdot (2 \cdot (N_{ID}^{NPRS} \bmod 512)+1)+2 \cdot (N_{ID}^{NPRS} \bmod 512)+N_{CP}.$$

$N_{CP}$ denotes the type of a cyclic prefix, $N_{ID}^{Ncell}$ denotes the identification of a narrowband physical layer cell, and $N_{ID}^{NPRS}$ denotes the identification of a narrowband positioning reference signal. Generally, $N_{ID}^{NPRS} \in \{0,1,\ldots,4095\}$, and $N_{ID}^{NPRS}$ is configured by a higher layer. In the case where $N_{ID}^{NPRS}$ is not configured, by default, $N_{ID}^{NPRS}=N_{ID}^{Ncell}$.

Positioning reference signals, NPRSs, in NB-IoT and positioning reference signals (PRSs) in Long Term Evolution (LTE) adopt the same design, NPRSs of different radio frames only have repetitive gains in the time domain, that is, each NPRS sequence transmitted by the radio frame is independent of the radio frame number, and the initialization value $c_{init}$ is only related to $N_{ID}^{NPRS}$ and the slot number. In an in-band mode, the first 3 OFDM symbols in the radio frame is used in physical downlink control channel (PDCCH) transmission in LTE and cannot be used for transmitting positioning reference signals, in the case where NPRS Bitmap is configured, the 5th and 6th OFDM symbols in each time slot cannot be used for transmitting NPRSs. Therefore, the sequence length of each radio frame that can be used for transmitting NPRSs in the in-band mode is greatly reduced. The reduction of the length of the NPRS sequence generated by the gold sequence may directly affect the estimation accuracy of the arrival time, and thus may affect the positioning accuracy. Moreover, the interference generated by the same $N_{ID}^{NPRS}$ in the neighbor cell cannot be eliminated, thereby causing performance degradation.

Embodiments of the present disclosure provide a signal transmission method. As shown in FIG. 1, the method includes the steps described below.

In S101, a second narrowband positioning reference signal sequence is generated according to a system frame number (SFN).

In S102, a second narrowband positioning reference signal is obtained according to the second narrowband positioning reference signal sequence.

In S103, a first narrowband positioning reference signal is transmitted on a first radio frame set, and the second narrowband positioning reference signal is transmitted on a second radio frame set.

In embodiments of the present disclosure, a second narrowband positioning reference signal sequence is generated according to an SFN so that a second narrowband positioning reference signal is obtained, and thus a first narrowband positioning reference signal is transmitted on a first radio frame set, and the second narrowband positioning reference signal is transmitted on a second radio frame set. In this manner, the length of the NPRS base sequence can be increased, the impact of NPRS conflicts between cells can be reduced, and thus the positioning performance can be effectively improved, and the preceding problem can be effectively solved.

In embodiments of the present disclosure, before the first narrowband positioning reference signal is transmitted on the first radio frame set, the method may further include the step described below.

The second initialization value is obtained by using the formula described below. The first narrowband positioning reference signal sequence is obtained according to the second initialization value $c_{init}$.

The second initialization value is described below.

$$c_{init}=2^{28} \cdot \lfloor N_{ID}^{NPRS}/512 \rfloor + 2^{10} \cdot (n_s+1)+l+1) \cdot (2 \cdot (N_{ID}^{NPRS} \bmod 512)+1)+2 \cdot (N_{ID}^{NPRS} \bmod 512)+N_{CP}.$$

In the formula, $N_{CP}$ denotes the type of a cyclic prefix, $N_{ID}^{NPRS}$ denotes the identification of a narrowband positioning reference signal, $n_s$ denotes a slot number in a radio frame, and 1 denotes an OFDM symbol number in a time slot.

In some embodiments, the step of generating the second narrowband positioning reference signal sequence according to the SFN includes the step described below.

A first initialization value is obtained according to the SFN, and the second narrowband positioning reference signal sequence is obtained according to the first initialization value.

Alternatively, a first narrowband positioning reference signal sequence is processed according to the SFN so that the second narrowband positioning reference signal sequence is obtained.

Alternatively, a first narrowband positioning reference signal sequence is scrambled according to the SFN so that the second narrowband positioning reference signal sequence is obtained.

In embodiments of the present disclosure, the traditional NPRS sequence is the first narrowband positioning reference signal, and the improved first narrowband positioning reference signal is the second narrowband positioning reference signal; the second initialization value is the initialization value of the pseudo random sequence in the traditional NPRS sequence, and the first initialization value is the initialization value of the pseudo random sequence in the improved NPRS sequence. The NPRS sequence may be referred to as the sequence for short description.

In some embodiments, the first radio frame set does not overlap with the second radio frame set; and a first radio frame in the first radio frame set includes at least one of a predefined radio frame, a radio frame obtained based on a configuration parameter M or a radio frame obtained based on a radio frame set configured by a base station. The predefined radio frame may be a radio frame with an SFN=0, 10 or 40, or may be an starting radio frame configured by the base station. The radio frame configured by the collective base station is the radio frame predefined by bitmap. It is feasible that the 3rd radio frame in the 10 radio frames are used for making sequences compatible while other radio frames in the 10 radio frames adopt a new sequence. The first radio frame set may be defined as the first positioning radio frame set, and the second radio frame set may be defined as the second positioning radio frame set.

Embodiment Two

Embodiments of the present disclosure provide a signal transmission method. As shown in FIG. 1, the method includes the steps described below. In S101, a second narrowband positioning reference signal sequence is generated according to an SFN. This step may include obtaining a first initialization value according to the SFN, and obtaining the second narrowband positioning reference signal sequence according to the first initialization value. The radio frame number, SFN, may also be referred to as a system frame number.

In S102, a second narrowband positioning reference signal is obtained according to the second narrowband positioning reference signal sequence.

In S103, a first narrowband positioning reference signal is transmitted on a first radio frame set, and the second narrowband positioning reference signal is transmitted on a second radio frame set.

In some embodiments, the first initialization value $c_{init}$ is obtained according to the SFN by using the formula described below.

The first initialization value is described below.

$$c_{init}=2^{28}\cdot\lfloor N_{ID}^{NPRS}/512\rfloor+2^{10}\cdot(7\cdot(n_s'+1)+l+1)\cdot((N_{ID}^{NPRS}\bmod 128)+1)+2\cdot(N_{ID}^{NPRS}\bmod 512)+N_{CP}.$$

In the formula, $n_s'=n_s+20\cdot(\text{SFN} \bmod M)$, $N_{CP}$ denotes the type of a cyclic prefix, $N_{ID}^{NPRS}$ denotes an identification of a narrowband positioning reference signal, $n_s$ denotes a slot number in a radio frame, and $l$ denotes an OFDM symbol number in a time slot.

Alternatively, the first initialization value is described below.

$$c_{init}=2^{10}\cdot(140\cdot\text{SFN}+7\cdot n_s+l+1)\cdot(\lfloor N_{ID}^{NPRS}/512\rfloor+1)+2\cdot(N_{ID}^{NPRS}\bmod 512)+N_{CP}.$$

In detail, embodiments of the present disclosure are mainly used for solving the problem of the relatively short NPRS sequence and the interference generated by the neighbor cell in positioning enhancement scenarios in the case where the NPRS sequence is in an in-band mode.

In embodiments of the present disclosure, the initialization value $c_{init}$ is changed so that the effective length of the NPRS sequence can be increased and the ability to resist the interference generated by the neighbor cell can be improved. For example, in the case where the SFN takes a special value, to maintain compatibility, the NPRS sequence is consistent with the traditional NPRS sequence or the PRS sequence; and in the case where the SFN takes a non-special value, a new designed sequence is used so that the effective length of the NPRS sequence can be increased. The design of the second narrowband positioning reference signal is described below.

In the case where SFN mod M=ϕ and ϕ⊂cΦ, Φ is the set of all possible values of SFN mod M. That is, the first radio frame set is Φ={0,1,2,Λ,M−1}, and $c_{init}$, of the traditional NPRS sequence is described below.

$$c_{init}=2^{28}\cdot\lfloor N_{ID}^{NPRS}/512\rfloor+2^{10}\cdot(7\cdot(n_s+1)+l+1)\cdot(2\cdot(N_{ID}^{NPRS}\bmod 512)+1)+2\cdot(N_{ID}^{NPRS}\bmod 512)+N_{CP}.$$

In the case where SFN mod M≠ϕ and ϕ⊂Φ, Φ is the set of all possible values of SFN mod M, Φ={0,1,2,Λ,M−1}, and the improved $c_{init}$ is described below.

$$c_{init}=\{2^{28}\cdot\lfloor N_{ID}^{NPRS}/512\rfloor+2^{10}\cdot(7\cdot(n_s'+1)+l+1)\cdot(2\cdot(N_{ID}^{NPRS}\bmod 512)+1)+2\cdot(N_{ID}^{NPRS}\bmod 512)+N_{CP}\}\bmod 2^{31},$$

where $n_s'=n_s+20\cdot\text{SFN}$.

In the case where SFN mod M≠ϕ, the improved $c_{init}$ may also be described below:

$$c_{init}=2^{24}\cdot\lfloor N_{ID}^{NPRS}/512\rfloor+(147\cdot(n_{rf}\bmod 64+1)+7\cdot(n_s+1)+l+1)\cdot(2\cdot(n_{ID}^{NPRS}\bmod 512)+1)+N_{CP}, \text{ or}$$

$$c_{init}=2^{28}\cdot\lfloor N_{ID}^{NPRS}/512\rfloor+2^{10}\cdot(7\cdot(n_s+1)+l+1)\cdot((N_{ID}^{NPRS}\bmod 128)+1)+2\cdot(N_{ID}^{NPRS}\bmod 512)+N_{CP},$$

where $n_s'=n_s+20\cdot(\text{SFN} \bmod M)$, and generally, the value of M is less than or equal to 8.

Alternatively, $$c_{init}=2^{10}\cdot(140\cdot\text{SFN}+7\cdot n_s+l+1)\cdot(\lfloor N_{ID}^{NPRs}/512\rfloor+1)+2\cdot(N_{ID}^{NPRS}\bmod 512)+N_{CP}.$$

Alternatively, $c_{init}$ remains unchanged, the generated sequence is changed from the original $a_{k,l}^{(p)}=r_{l,n_s}(m')$ to $a_{k,l}^{(p)}=r_{l,n_s}((m'+2\cdot\text{SFN}) \bmod 220)$.

Figure 2:
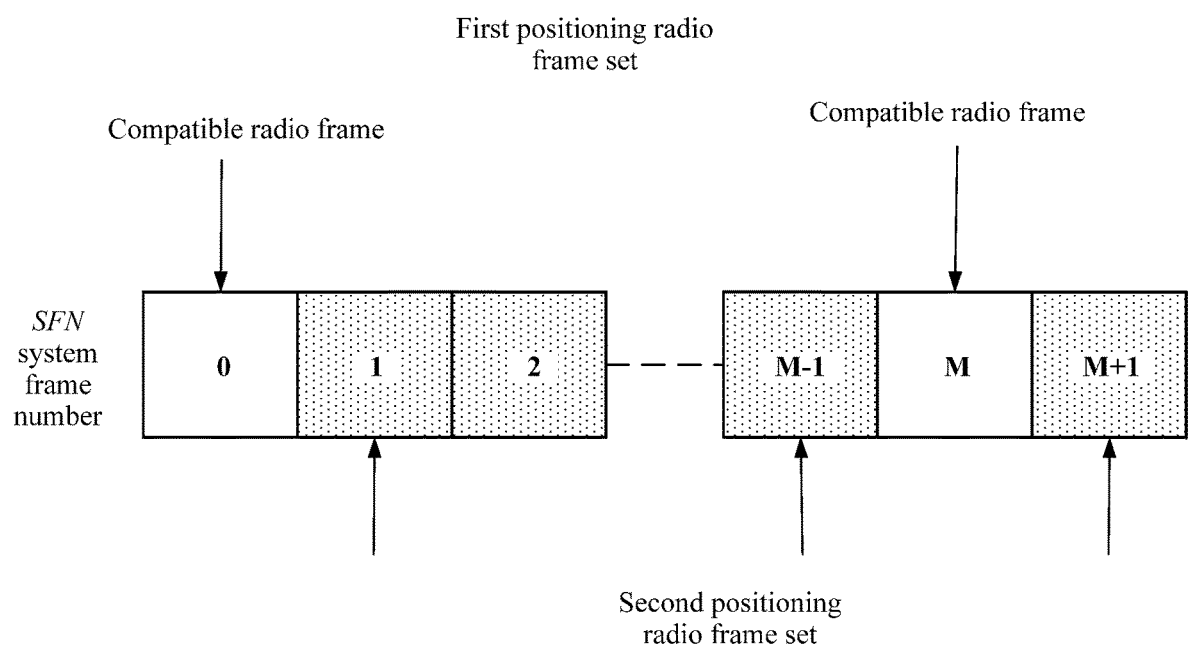
FIG. 2 is a schematic diagram of an optional position of a first radio frame set and a second radio frame set according to an embodiment of the present disclosure.

In the case where the SFN takes the set ϕ, the sequence of the SFN is consistent with the traditional NPRS sequence. For example, as shown in FIG. 2, in the case where M=4, ϕ={0,2}, all radio frames with SFN mod M=0 and SFN mod M=2 remains consistent with the original sequence while all radio frames of SFN mod M=1 and SFN mod M=3 adopt the improved NPRS sequence.

In embodiments of the present disclosure, the principle of obtaining a second narrowband positioning reference signal according to a second narrowband positioning reference signal sequence is the same as the principle in embodiment one. For example, the first pseudo random sequence of the second narrowband positioning reference signal sequence can be obtained according to the first initialization value $c_{init}$, and the first pseudo random sequence of the first narrowband positioning reference signal sequence in the formula of the NPRS reference sequence $r_{l,n_s}(m)$ is replaced with the first pseudo random sequence of the second narrowband positioning reference signal sequence so that the improved NPRS can be obtained.

In this embodiment, SFN mod M=ϕ is set so that the NPRS sequence generated corresponding to the value $c_{init}$ is generated. In this manner, compatibility with multiple radio frames can be achieved, increase in the effective length of the sequence can be ensured; and the positioning estimation accuracy can be ensured, meanwhile, the interference generated by the neighbor cell with the same $N_{ID}^{NPRS}$ can be effectively resisted.

Embodiment Three

Embodiments of the present disclosure provide a signal transmission method. As shown in FIG. 1, the method includes the steps described below.

In S101, a second narrowband positioning reference signal sequence is generated according to an SFN. This step may include processing a first narrowband positioning reference signal sequence according to the SFN to obtain the second narrowband positioning reference signal sequence.

In S102, a second narrowband positioning reference signal is obtained according to the second narrowband positioning reference signal sequence.

In S103, a first narrowband positioning reference signal is transmitted on a first radio frame set, and the second narrowband positioning reference signal is transmitted on a second radio frame set.

In some embodiments, the first narrowband positioning reference signal sequence is processed according to the SFN by using the formula described below:

$$a_{k,l}^{(p)} = r_{l,n_s}((m'+2 \cdot (\text{SFN mod } M)) \text{mod } 220).$$

In the formula, $r_{l,n_s}( )$ denotes the first narrowband positioning reference signal sequence, m' denotes a position of the sequence symbol $r_{l,n_s}( )$, and $a_{k,l}^{(p)}$ denotes the second narrowband positioning reference signal obtained through mapping.

In detail, this embodiment is mainly used for solving the problem of the relatively short NPRS sequence and the interference generated by the neighbor cell in positioning enhancement scenarios in the case where the NPRS sequence is in an in-band mode. In embodiments of the present disclosure, the initialization value $c_{init}$ of the generated sequence is not changed, and different positions where the sequences are generated are changed so that the effective length of the NPRS sequence can be increased and the ability to resist the interference generated by the neighbor cell can be improved. For example, the manner of the traditional sequence $a_{k,l}^{(p)} = r_{l,n_s}(m')$ is improved, a radio frame number is introduced, and the generated sequences in M radio frames are different from each other so that the effective length of the sequence can be increased. Meanwhile, each sequence is related to the radio frame number so that the interference generated by the neighbor cell can be effectively resisted. The manner of improvement is described below:

$$a_{k,l}^{(p)} = r_{l,n_s}((m'+2 \cdot (\text{SFN mod } M)) \text{mod } 220).$$

In this case, the value of $c_{init}$ is ensured to remain unchanged; and in M consecutive radio frames transmitting NPRSs, the sequences corresponding to different radio frame numbers are from the same sequence but are from different positions. Therefore, the sequences are different from each other. In the (M+1)th radio frame, the transmitted NPRS sequence is the same as the 1st sequence.

In this embodiment, the sequence is generated according to the value $c_{init}$ the current SFN is introduced, and the sequence is processed, so that the sequences obtained in M consecutive radio frames are different from each other, the effective length of the NPRS sequence can be effectively increased and the interference generated by the neighbor cell with the same $N_{ID}^{NPRS}$ can be effectively resisted.

Embodiment Four

Embodiments of the present disclosure provide a signal transmission method. As shown in FIG. 1, the method includes the steps described below.

In S101, a second narrowband positioning reference signal sequence is generated according to an SFN. This step may include obtaining a first initialization value according to the SFN, and obtaining the second narrowband positioning reference signal sequence according to the first initialization value. The first initialization value is the initialization value of the first pseudo random sequence of the second narrowband positioning reference signal sequence.

In S102, a second narrowband positioning reference signal is obtained according to the second narrowband positioning reference signal sequence.

In S103, a first narrowband positioning reference signal is transmitted on a first radio frame set, and the second narrowband positioning reference signal is transmitted on a second radio frame set.

In detail, this embodiment is mainly used for solving the problem of the relatively short NPRS sequence and the interference generated by the neighbor cell in positioning enhancement scenarios in the case where the NPRS sequence is in an in-band mode.

In embodiments of the present disclosure, the initialization value $c_{init}$ is changed so that the effective length of the NPRS sequence can be increased and the ability to resist the interference generated by the neighbor cell can be improved. For example, in the first radio frame transmitting NPRSs, the NPRS sequence remains compatible with the PRS sequence in LTE. In the 2nd to Mth radio frames transmitting NPRSs, the value of cilia is changed by introduction of the SFN so that sequences different from the NPRS sequence in the first radio frame are obtained. Apparently, NPRS sequences carried in the M consecutively transmitted radio frames are different from each other. Moreover, since the SFN is introduced into each NPRS sequence, the interference between neighbor cells can be dramatically reduced.

The design of the improved initialization value is described below:

$$c_{init} = \{2^{28} \cdot \lfloor N_{ID}^{NPRS}/512 \rfloor + 2^{10} \cdot (7 \cdot (n_s'+1) + l + 1) \cdot (2 \cdot (N_{ID}^{NPRS} \text{ mod } 512) + 1) + 2 \cdot (N_{ID}^{NPRS} \text{ mod } 512) + N_{CP}\} \text{mod } 2^{31},$$

where $n_s' = n_s + 20 \cdot (\text{SFN mod } M)$.

The model value is $2^{31}$ so that the value of $c_{init}$ is less than 31 bits. $n_s' = n_s + 20 \cdot (\text{SFN mod } M)$ denotes that in M consecutive radio frames transmitting NPRSs, since SFNs are different, $n_s'$'s are different and $n_s$'s are different, that is, NPRS sequences transmitted in radio frames are different from each other. Since $n_s'$ in the (M+1)th radio frame is the same as $n_s'$ in the 1st radio frame, the generated sequences are the same, that is, only retransmission gains exist. In this case, the effective length of the sequence is equivalent to increasing from the length of the NPRS sequence in one radio frame originally to the length of sequences in M radio frames so that the ability to resist the interference during sequence decoding can be increased. Moreover, the introduction of the SFN greatly reduces the interference generated by the neighbor cell with the same $N_{ID}^{NPRS}$.

In embodiments of the present disclosure, the initialization value $c_{init}$ of the generated sequence can be affected by introduction of the current SFN, the effective length of the NPRS sequence can be effectively increased, the ability to resist the interference during sequence decoding can be increased, and the interference from the neighbor cell can be avoided. Moreover, the NPRS in the 1st, (1+M)th, (1+2M)th and (1+XM)th radio frames remain compatible with the traditional NPRS.

Embodiment Five

Embodiments of the present disclosure provide a signal transmission method. As shown in FIG. 1, the method includes the steps described below.

In S101, a second narrowband positioning reference signal sequence is generated according to an SFN. This step may include obtaining a first initialization value according to the SFN, and obtaining the second narrowband positioning reference signal sequence according to the first initialization value.

In S102, a second narrowband positioning reference signal is obtained according to the second narrowband positioning reference signal sequence.

In S103, a first narrowband positioning reference signal is transmitted on a first radio frame set, and the second narrowband positioning reference signal is transmitted on a second radio frame set.

In some embodiments, the first initialization value $c_{init}$ is obtained according to the SFN by using the formula described below.

The first initialization value is described below.

$$c_{init} = \{2^{28} \cdot \lfloor N_{ID}^{NPRS}/512 \rfloor + 2^{10} \cdot (7 \cdot (n_s'+1)+l+1) \cdot (2 \cdot (N_{ID}^{NPRS} \bmod 512)+1) + 2 \cdot (N_{ID}^{NPRS} \bmod 512) + N_{CP}\} \bmod 2^{31}$$

In the formula, $n_s' = n_s + 20 \cdot h \cdot SFN$, or $n_s' = n_s + 20 \cdot h \cdot (SFN - SFN_{start} - M + 1)$;

$$h = \begin{cases} 0, & \text{if } 0 \le SFN - SFN_{start} < M \\ 1, & \text{if } M \le SFN - SFN_{start} \end{cases}; \text{ and}$$

$N_{CP}$ denotes the type of cyclic prefix, $N_{ID}^{NPRS}$ denotes an identification of a narrowband positioning reference signal, $n_s$ denotes a slot number in a radio frame, and l denotes an OFDM symbol number in a time slot.

In detail, this embodiment is mainly used for solving the problem of the short NPRS sequence and the interference generated by the neighbor cell in positioning enhancement scenarios in the case where the NPRS sequence is in an in-band mode.

Figure 3:
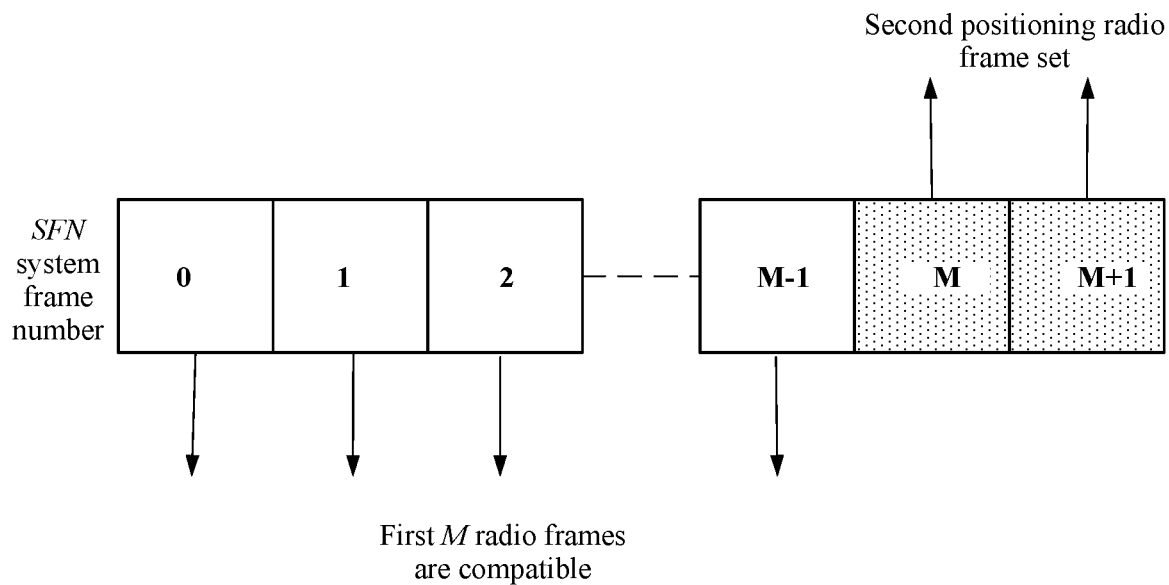
FIG. 3 is a schematic diagram of another optional position of a first radio frame set and a second radio frame set according to an embodiment of the present disclosure.
Figure 4:
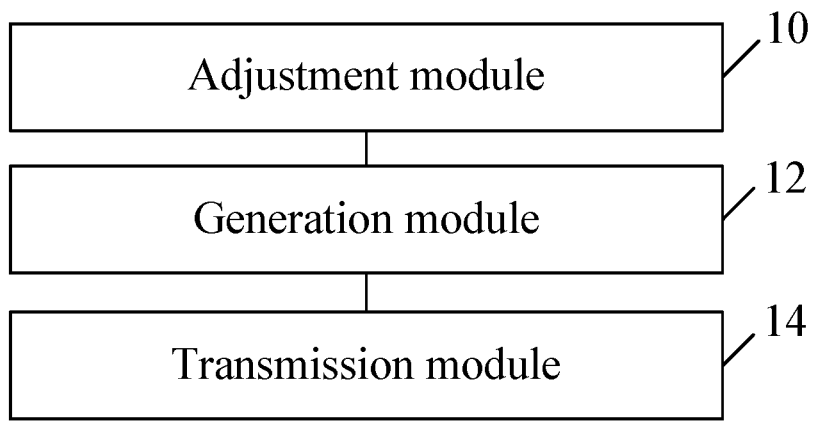
FIG. 4 is a structure diagram of a signal transmission apparatus according to an embodiment of the present disclosure.

In the preceding embodiment two to embodiment four, the common object is increasing the effective length of the sequence, and the adopted manners are periodically transmitting the traditional-version sequence every few radio frames to maintain compatibility with NPRSs. In embodiments of the present disclosure, as shown in FIG. 3, the object remains to be increasing the effective length of the sequence and improving the ability to resist the interference, and the manner of maintaining compatibility with NPRSs is changed to be for all radio frames transmitting NPRSs, enabling the first M radio frames to be consistent with the original version rather than remaining consistent with the traditional version by using periodical radio frames. The manner of improvement is described below.

$$c_{init} = \{2^{28} \cdot \lfloor N_{ID}^{NPRS}/512 \rfloor + 2^{10} \cdot (7 \cdot (n_s'+1)+l+1) \cdot (2 \cdot (N_{ID}^{NPRS} \bmod 512)+1) + 2 \cdot (N_{ID}^{NPRS} \bmod 512) + N_{CP}\} \bmod 2^{31};$$

$n_s' = n_s + 20 \cdot h \cdot SFN$, or $n_s' = n_s + 20 \cdot h \cdot (SFN - SFN_{start} - M+1)$; and $$h = \begin{cases} 0, & \text{if } 0 \le SFN - SFN_{start} < M \\ 1, & \text{if } M \le SFN - SFN_{start} \end{cases}.$$

That is, in embodiments of the present disclosure, in the case where the difference between the current SFN and the $SFN_{start}$ at the start of NPRS sequence transmission is less than M, the current sequence is consistent with the traditional sequence, that is, it may be configured that NPRS sequences transmitted by the M radio frames remain compatible with the traditional NPRS sequences; and in the case where the difference between the current SFN and the $SFN_{start}$ at the start of NPRS sequence transmission is greater than or equal to M, the improved sequence is used so that the effective length of the sequence can be improved.

In this embodiment, the difference between the current SFN and the $SFN_{start}$ is introduced to ensure the sequences of the first M radio frames to be compatible with the traditional sequences, and sequences generated by using new values of $c_{init}$ are adopted in the subsequent radio frames so that the effective length of the NPRS sequence can be effectively increased and the interference generated by the neighbor cell with the same $N_{ID}^{NPRS}$ can be effectively resisted.

Embodiment Six

Embodiments of the present disclosure provide a signal transmission method. As shown in FIG. 1, the method includes the steps described below.

In S101, a second narrowband positioning reference signal sequence is generated according to an SFN. This step may include scrambling a first narrowband positioning reference signal sequence according to the SFN to obtain the second narrowband positioning reference signal sequence.

In S102, a second narrowband positioning reference signal is obtained according to the second narrowband positioning reference signal sequence.

In S103, a first narrowband positioning reference signal is transmitted on a first radio frame set, and the second narrowband positioning reference signal is transmitted on a second radio frame set.

In some embodiments, the step of scrambling the first narrowband positioning reference signal sequence according to the SFN includes the step described below.

A scrambling code T(i) is obtained according to the SFN by using the following formula; and the first narrowband positioning reference signal sequence is scrambled according to the scrambling code T.

In the case where SFN mod M=φ, T(i)=1.
In the case where SFN mod M≠φ, $$T(i) = \begin{cases} 1, & \text{if } c_{l,n_s}(2i) = 0 \text{ and } c_{l,n_s}(2i+1) = 0 \\ -1, & \text{if } c_{l,n_s}(2i) = 0 \text{ and } c_{l,n_s}(2i+1) = 1 \\ j, & \text{if } c_{l,n_s}(2i) = 1 \text{ and } c_{l,n_s}(2i+1) = 0 \\ -j, & \text{if } c_{l,n_s}(2i) = 1 \text{ and } c_{l,n_s}(2i+1) = 1 \end{cases}.$$

In the formula, a second pseudo random sequence $c_{l,n_s}(x)$ is determined by a third initialization value civic $c_{init}$.

The third initialization value $c_{init}$ is described below.

$$c_{init} = \{2^{28} \cdot \lfloor N_{ID}^{NPRS}/512 \rfloor + 2^{10} \cdot (7 \cdot (n_s'+1)+l+1) \cdot (2 \cdot (N_{ID}^{NPRS} \bmod 512)+1) + 2 \cdot (N_{ID}^{NPRS} \bmod 512) + N_{CP}\} \bmod 2^{31}$$

$n_s' = n_s + 20 \cdot SFN$.

Alternatively, the third initialization value $c_{init}$ is described below.

$$c_{init} = 2^{10} \cdot (140 \cdot SFN + 7 \cdot n_s + l + 1) \cdot (\lfloor N_{ID}^{NPRS}/512 \rfloor + 1) + 2 \cdot (N_{ID}^{NPRS} \bmod 512) + N_{CP}.$$

In the formula, x denotes 2i or 2i+1, i=0, ..., $2N_{RB}^{max,DL}-1$, x=0, 1 ..., $4N_{RB}^{max,DL}-1$, $N_{CP}$ denotes the type of a cyclic prefix, $N_{ID}^{NPRS}$ denotes an identification of a narrowband positioning reference signal, $n_s$ denotes a slot number in a radio frame, $N_{RB}^{max,DL}$ denotes the number of RBs under the maximum downlink bandwidth, $\phi$ denotes the first radio frame set, and l denotes an OFDM symbol number in a time slot.

In some embodiments, the step of scrambling the first narrowband positioning reference signal sequence according to the SFN includes the step described below.

A scrambling code T(i) is obtained according to the SFN by using the formula described below; and the first narrowband positioning reference signal sequence is scrambled according to the scrambling code T.

In the case where $0 \leq SFN-SFN_{start} < M$, T(i)=1.
In the case where $SFN-SFN_{start} \geq M$, $$T(i) = \begin{cases} 1, & \text{if } c_{l,n_s}(2i) = 0 \text{ and } c_{l,n_s}(2i+1) = 0 \\ -1, & \text{if } c_{l,n_s}(2i) = 0 \text{ and } c_{l,n_s}(2i+1) = 1 \\ j, & \text{if } c_{l,n_s}(2i) = 1 \text{ and } c_{l,n_s}(2i+1) = 0 \\ -j, & \text{if } c_{l,n_s}(2i) = 1 \text{ and } c_{l,n_s}(2i+1) = 1 \end{cases}.$$

In the formula, a second pseudo random sequence $c_{l,n_s}(x)$ is determined by a third initialization value $c_{init}$.

The third initialization value $c_{init}$ is described below.

$c_{init} = \{2^{28} \cdot \lfloor N_{ID}^{NPRS}/512 \rfloor + 2^{10} \cdot (7 \cdot (n_s'+1)+l+1) \cdot (2 \cdot (N_{ID}^{NPRS} \bmod 512)+1)+2 \cdot (N_{ID}^{NPRS} \bmod 512)+N_{CP}\} \bmod 2^{31}$.

$n_s' = n_s + 20 \cdot SFN$.

Alternatively, the third initialization value $c_{init}$ is described below.

$c_{init} = 2^{10} \cdot (140 \cdot SFN+7 \cdot n_s+l+1) \cdot (\lfloor N_{ID}^{NPRS}/512 \rfloor+1)+2 \cdot (N_{ID}^{NPRS} \bmod 512)+N_{CP}$.

In the formula, x denotes 2i or 2i+1, i=0, . . . , $2N_{RB}^{max,DL}-1$, x=0, 1, . . . , $4N_{RB}^{max,DL}-1$, $N_{CP}$ denotes the type of a cyclic prefix, $N_{ID}^{NPRS}$ denotes an identification of a narrowband positioning reference signal, $n_s$ denotes a slot number in a radio frame, $N_{RB}^{max,DL}$ denotes the number of RBs under the maximum downlink bandwidth, and l denotes an OFDM symbol number in a time slot.

In detail, this embodiment is mainly used for solving the problem of the relatively short NPRS sequence and the interference generated by the neighbor cell in positioning enhancement scenarios in the case where the NPRS sequence is in an in-band mode.

As shown in FIG. 2, in the preceding embodiment of the present disclosure, in the case where the effective length of the NPRS sequence can be effectively increased, the adopted manners include generating the new value of $c_{init}$ and generating the sequence at different positions. In these manners, the generated sequence is directly affected. In embodiments of the present disclosure, the generated sequence $r_{l,n_s}$ is scrambled by introduction of the current SFN, and thus the same effect is achieved. The specific design manner is described below.

$a_{k,l}^{(P)} = r_{l,n_s} \times T$.

In the case where SFN mod M=$\phi$ and $\phi \in \Phi$, $\Phi$ is the set of all possible values of SFN mod M, that is, in the case where $\Phi = \{0,1,2,\Lambda,M-1\}$, T(i)=1.
In the case where SFN mod M$\neq \phi$, $$T(i) = \begin{cases} 1, & \text{if } c_{l,n_s}(2i) = 0 \text{ and } c_{l,n_s}(2i+1) = 0 \\ -1, & \text{if } c_{l,n_s}(2i) = 0 \text{ and } c_{l,n_s}(2i+1) = 1 \\ j, & \text{if } c_{l,n_s}(2i) = 1 \text{ and } c_{l,n_s}(2i+1) = 0 \\ -j, & \text{if } c_{l,n_s}(2i) = 1 \text{ and } c_{l,n_s}(2i+1) = 1 \end{cases}.$$

In the formula, a second pseudo random sequence $c_{l,n_s}(x)$ is determined by a third initialization value $c_{init}$.

The third initialization value $c_{init}$ is described below.

$c_{init} = \{2^{28} \cdot \lfloor N_{ID}^{NPRS}/512 \rfloor + 2^{10} \cdot (7 \cdot (n_s'+1)+l+1) \cdot (2 \cdot (N_{ID}^{NPRS} \bmod 512)+1)+2 \cdot (N_{ID}^{NPRS} \bmod 512)+N_{CP}\} \bmod 2^{31}$ $n_s' = n_s + 20 \cdot SFN$.

Alternatively, the third initialization value $c_{init}$ is described below.

$c_{init} = 2^{10} \cdot (140 \cdot SFN+7 \cdot n_s+l+1) \cdot (\lfloor N_{ID}^{NPRS}/512 \rfloor+1)+2 \cdot (N_{ID}^{NPRS} \bmod 512)+N_{CP}$.

The value of $c_{init}$ is related to the SFN, the cell ID, the slot number and the OFDM symbol l at the time domain position. In the case where the SFN changes, the initialization value $c_{init}$ corresponding to the SFN changes, a different sequence $c_{l,n_s}(x)$ is generated, and a different T is obtained. In this case, $r_{l,n_s}$ s of radio frames are different from each other. Since different Ts exist, the obtained modulated sequences are also different from each other, that is, the effective length of the NPRS sequence can be increased.

Similarly, as shown in FIG. 3, in the case where compatibility is ensured by using the first M radio frames instead of by using periodically-alternate specific radio frames, the design solution may be described below.

In the case where $0 \leq SFN-SFN_{start} < M$, T(i)=1.
In the case where $SFN-SFN_{start} \geq M$, $$T(i) = \begin{cases} 1, & \text{if } c_{l,n_s}(2i) = 0 \text{ and } c_{l,n_s}(2i+1) = 0 \\ -1, & \text{if } c_{l,n_s}(2i) = 0 \text{ and } c_{l,n_s}(2i+1) = 1 \\ j, & \text{if } c_{l,n_s}(2i) = 1 \text{ and } c_{l,n_s}(2i+1) = 0 \\ -j, & \text{if } c_{l,n_s}(2i) = 1 \text{ and } c_{l,n_s}(2i+1) = 1 \end{cases}.$$

In this embodiment, in the specific radio frame, the compatibility with the traditional NPRS sequence is still ensured. In the second narrowband positioning reference signal transmitted on the second radio frame set, the generated sequence is processed by using a scrambling code, and the effect of the SFN is introduced so that the effective length of the sequence can be increased.

Embodiment Seven

Embodiments of the present disclosure provide a signal transmission apparatus. As shown in FIG. 2, the apparatus includes an adjustment module 10, a generation module 12 and a transmission module 14.

The adjustment module 10 is configured to generate a second narrowband positioning reference signal sequence according to a SFN.

The generation module 12 is configured to obtain a second narrowband positioning reference signal according to the second narrowband positioning reference signal sequence.

The transmission module 14 is configured to transmit a first narrowband positioning reference signal on a first radio frame set, and transmit the second narrowband positioning reference signal on a second radio frame set.

In some embodiments, the adjustment module 10 may be specifically configured to obtain a first initialization value according to the SFN.

Alternatively, the adjustment module 10 may be specifically configured to process a first narrowband positioning reference signal sequence according to the SFN to obtain the second narrowband positioning reference signal sequence.

Alternatively, the adjustment module 10 may be specifically configured to scramble a first narrowband positioning reference signal sequence according to the SFN to obtain the second narrowband positioning reference signal sequence.

In some embodiments, the first radio frame set does not overlap with the second radio frame set; and a first radio frame in the first radio frame set includes at least one of a predefined radio frame, a radio frame obtained based on a configuration parameter M or a radio frame obtained based on a radio frame set configured by a base station.

In some embodiments, the first initialization value $c_{init}$ is obtained according to the SFN by using the formula described below.

The first initialization value is described below.

$$c_{init}=2^{28}\cdot\lfloor N_{ID}^{NPRS}/512 \rfloor+2^{10}\cdot(7\cdot(n_s'+1)+l+1)\cdot((N_{ID}^{NPRS} \bmod 128)+1)+2\cdot(N_{ID}^{NPRS} \bmod 512)+N_{CP}.$$

In the formula, $n_s'=n_s+20\cdot(\text{SFN} \bmod M)$, $N_{CP}$ denotes the type of a cyclic prefix, $N_{ID}^{NPRS}$ denotes an identification of a narrowband positioning reference signal, $n_s$ denotes a slot number in a radio frame, and l denotes an OFDM symbol number in a time slot.

In some embodiments, the adjustment module 10 may be specifically configured to process the first narrowband positioning reference signal sequence according to the SFN by using the formula described below.

$$a_{k,l}^{(p)}=r_{l,n_s}((m'+2\cdot(\text{SFN} \bmod M)) \bmod 220).$$

In the formula, $r_{l,n_s}(\ )$ denotes the first narrowband positioning reference signal sequence, and m' denotes a mapping position.

In some embodiments, the adjustment module 10 may be specifically configured to obtain the first initialization value $c_{init}$ according to the SFN by using the formula described below.

The first initialization value is described below.

$$c_{init}=\{2^{28}\cdot\lfloor N_{ID}^{NPRS}/512 \rfloor+2^{10}\cdot(7\cdot(n_s'+1)+l+1)\cdot(2\cdot(N_{ID}^{NPRS} \bmod 512)+1)+2\cdot(N_{ID}^{NPRS} \bmod 512)+N_{CP}\} \bmod 2^{31}$$

In the formula, $n_s'=n_s+20\cdot h\cdot \text{SFN}$, or $n_s'=n_s+20\cdot h\cdot(\text{SFN}-\text{SFN}_{start}-M+1)$.

$$h = \begin{cases} 0, & \text{if } 0 \le SFN - SFN_{start} < M \\ 1, & \text{if } M \le SFN - SFN_{start} \end{cases}.$$

$N_{CP}$ denotes the type of a cyclic prefix, $N_{ID}^{NPRS}$ denotes an identification of a narrowband positioning reference signal, $n_s$ denotes a slot number in a radio frame, and l denotes an OFDM symbol number in a time slot.

In some embodiments, the adjustment module 10 may be specifically configured to obtain a scrambling code T(i) according to the SFN and scramble the first narrowband positioning reference signal sequence according to the scrambling code T.

In the case where SFN mod M=ϕ, T(i)=1.
In the case where SFN mod M≠ϕ, $$T(i) = \begin{cases} 1, & \text{if } c_{l,n_s}(2i) = 0 \text{ and } c_{l,n_s}(2i+1) = 0 \\ -1, & \text{if } c_{l,n_s}(2i) = 0 \text{ and } c_{l,n_s}(2i+1) = 1 \\ j, & \text{if } c_{l,n_s}(2i) = 1 \text{ and } c_{l,n_s}(2i+1) = 0 \\ -j, & \text{if } c_{l,n_s}(2i) = 1 \text{ and } c_{l,n_s}(2i+1) = 1 \end{cases}.$$

In the formula, a second pseudo random sequence $c_{l,n_s}(x)$ is determined by a third initialization value $c_{init}$.

The third initialization value is described below.

$$c_{init}=\{2^{28}\cdot\lfloor N_{ID}^{NPRS}/512 \rfloor+2^{10}\cdot(7\cdot(n_s'+1)+l+1)\cdot(2\cdot(N_{ID}^{NPRS} \bmod 512)+1)+2\cdot(N_{ID}^{NPRS} \bmod 512)+N_{CP}\} \bmod 2^{31}.$$

$n_s'=n_s+20\cdot\text{SFN}$.

Alternatively, the third initialization value $c_{init}$ is described below.

$$c_{init}=2^{10}\cdot(140\cdot\text{SFN}+7\cdot n_s+l+1)\cdot(\lfloor N_{ID}^{NPRS}/512 \rfloor+1)+2\cdot(N_{ID}^{NPRS} \bmod 512)+N_{CP}.$$

In the formula, x denotes 2i or 2i+1, i=0, ..., $2N_{RB}^{max,DL}-1$, x=0, 1, ..., $4N_{RB}^{max,DL}-1$, $N_{CP}$ denotes the type of a cyclic prefix, $N_{ID}^{NPRS}$ denotes an identification of a narrowband positioning reference signal, $n_s$ denotes a slot number in a radio frame, $N_{RB}^{max,DL}$ denotes the number of RBs under the maximum downlink bandwidth, ϕ denotes the first radio frame set, and l denotes an OFDM symbol number in a time slot.

In some embodiments, the adjustment module 10 may be specifically configured to obtain a scrambling code T(i) according to the SFN and scramble the first narrowband positioning reference signal sequence according to the scrambling code T.

In the case where $0 \le \text{SFN}-\text{SFA}_{start}<M$, T(i)=1.
In the case where $\text{SFN}-\text{SFN}_{start} \ge M$, $$T(i) = \begin{cases} 1, & \text{if } c_{l,n_s}(2i) = 0 \text{ and } c_{l,n_s}(2i+1) = 0 \\ -1, & \text{if } c_{l,n_s}(2i) = 0 \text{ and } c_{l,n_s}(2i+1) = 1 \\ j, & \text{if } c_{l,n_s}(2i) = 1 \text{ and } c_{l,n_s}(2i+1) = 0 \\ -j, & \text{if } c_{l,n_s}(2i) = 1 \text{ and } c_{l,n_s}(2i+1) = 1 \end{cases}.$$

In the formula, a second pseudo random sequence $c_{l,n_s}(x)$ is determined by a third initialization value $c_{init}$.

The third initialization value $c_{init}$ is described below.

$$c_{init}=\{2^{28}\cdot\lfloor N_{ID}^{NPRS}/512 \rfloor+2^{10}\cdot(7\cdot(n_s'+1)+l+1)\cdot(2\cdot(N_{ID}^{NPRS} \bmod 512)+1)+2\cdot(N_{ID}^{NPRS} \bmod 512)+N_{CP}\} \bmod 2^{31}.$$

$n_s'=n_s+20\cdot\text{SFN}$.

Alternatively, the third initialization value $c_{init}$ is described below.

$$c_{init}=2^{10}\cdot(140\cdot\text{SFN}+7\cdot n_s+l+1)\cdot(\lfloor N_{ID}^{NPRS}/512 \rfloor+1)+2\cdot(N_{ID}^{NPRS} \bmod 512)+N_{CP}.$$

In the formula, x denotes 2i or 2i+1, i=0, ..., $2N_{RB}^{max,DL}-1$, x=0, 1, ..., $4N_{RB}^{max,DL}-1$, $N_{CP}$ denotes the type of a cyclic prefix, $N_{ID}^{NPRS}$ denotes an identification of a narrowband positioning reference signal, $n_s$ denotes a slot number in a radio frame, $N_{RB}^{max,DL}$ denotes the number of RBs under the maximum downlink bandwidth, and l denotes an OFDM symbol number in a time slot.

In some embodiments, the adjustment module 10 may be specifically configured to, before the first narrowband positioning reference signal is transmitted on the first radio frame set, obtain a second initialization value by using the formula described below and obtain the first narrowband positioning reference signal sequence according to the second initialization value.

The second initialization value is described below.

$$c_{init}=2^{28}\cdot\lfloor N_{ID}^{NPRS}/512 \rfloor+2^{10}\cdot(7\cdot(n_s+1)+l+1)\cdot((N_{ID}^{NPRS} \bmod 128)+1)+2\cdot(N_{ID}^{NPRS} \bmod 512)+N_{CP}.$$

$N_{CP}$ denotes the type of a cyclic prefix, $N_{ID}^{NPRS}$ denotes an identification of a narrowband positioning reference signal, $n_s$ denotes a slot number in a radio frame, and l denotes an OFDM symbol number in a time slot.

Embodiment Eight

Figure 5:
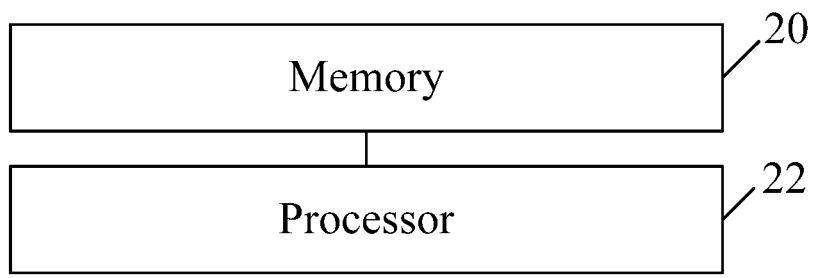
FIG. 5 is a structure diagram of a signal transmission device according to an embodiment of the present disclosure.

Embodiments of the present disclosure provide a signal transmission device. As shown in FIG. 5, the device includes a memory 20 and a processor 22. The memory 20 is configured to store a computer program about signal transmission. The processor 22 executes the computer program to perform the steps of the method provided in any one of embodiment one to embodiment six.

Embodiment Nine

Embodiments of the present disclosure further provide a computer-readable storage medium storing a computer program about signal transmission. When executed by one or more processors, the computer program causes the one or more processors to perform the steps of the method provided in any one of embodiment one to embodiment six.

In embodiments of the present disclosure, the computer-readable storage medium may be a random-access memory (RAM), a flash memory, a read-only memory (ROM), an erasable programmable ROM (EPROM), an electrically erasable programmable read-only memory (EEPROM), a register, a hard disk, a mobile hard disk, a compact disc read-only memory (CD-ROM) or any other form of storage medium that known in the art. A storage medium may be coupled to the processor such that the processor is able to read information from, and write information to, the storage medium; or the storage medium may be a component of the processor. The processor and the storage medium may be located in a specific integrated circuit.

It is to be noted herein that when embodiment seven to embodiment nine are specifically implemented, reference may be made to embodiment one to embodiment six, and embodiment seven to embodiment nine have the corresponding technical effects.

What is claimed is:

1. A signal transmission method, comprising:
generating a second narrowband positioning reference signal sequence at least according to a system frame number (SFN);
obtaining a second narrowband positioning reference signal according to the second narrowband positioning reference signal sequence; and
transmitting a first narrowband positioning reference signal on a first radio frame set, and transmitting the second narrowband positioning reference signal on a second radio frame set;
wherein generating the second narrowband positioning reference signal sequence at least according to the SFN comprises:

$a_{k,l}^{(p)} = r_{l,n_s}((m'+2\cdot(\text{SFN mod } M)) \text{mod } 220)$, where $r_{l,n_s}(\ )$ denotes the first narrowband positioning reference signal sequence, m' denotes a position of a symbol in the sequence $r_{l,n_s}(\ )$, and M denotes a value configured by the base station or a predefined value.

2. The method of claim 1, wherein the first radio frame set does not overlap with the second radio frame set; and a first radio frame in the first radio frame set comprises at least one of a predefined radio frame, a radio frame obtained based on a configuration parameter M or a radio frame obtained based on a radio frame set configured by a base station.

3. The method of claim 1, wherein the first narrowband positioning reference signal sequence is determined by the first initialization value according to the SFN, which comprises:
obtaining the first initialization value $c_{init}$ according to the SFN by using the following formula:

$c_{init} = 2^{28} \cdot \lfloor N_{ID}^{NPRS}/512 \rfloor + 2^{10} \cdot (7\cdot(n_s'+1)+l+1) \cdot$
$((N_{ID}^{NPRS} \text{ mod } 128)+1)+2\cdot(N_{ID}^{NPRS} \text{ mod } 512)+$
$N_{CP}$, wherein $n_s' = n_s + 20\cdot(\text{SFN mod }M)$; or $c_{init} = \{2^{28} \cdot \lfloor N_{ID}^{NPRS}/512 \rfloor + 2^{10}\cdot(7\cdot(n_s'+1)+l+1)\cdot(2\cdot$
$(N_{ID}^{NPRS} \text{ mod } 512)+1)+2\cdot(N_{ID}^{NPRS} \text{ mod } 512)+$
$N_{CP}\} \text{mod } 2^{31}$ wherein $n_s' = n_s+20\cdot h\cdot \text{SFN}$ or $n_s' = n_s+20\cdot h\cdot(\text{SFN}-\text{SFN}_{start}-M+1)$, and $$h = \begin{cases} 0, & \text{if } 0 \leq SFN - SFN_{start} < M \\ 1, & \text{if } M \leq SFN - SFN_{start} \end{cases};$$

or $c_{init} = 2^{10}\cdot(140\cdot\text{SFN}+7\cdot n_s+l+1)\cdot(\lfloor N_{ID}^{NPRS}/512 \rfloor+1)+2\cdot$
$(N_{ID}^{NPRS} \text{ mod } 512)+N_{CP}$, where $N_{CP}$ denotes a type of a cyclic prefix, $N_{ID}^{NPRS}$ denotes an identification of a narrowband positioning reference signal, $n_s$ denotes a slot number in a radio frame, l denotes an OFDM symbol number in a time slot, M denotes a value configured by the base station or a predefined value, and $\text{SFN}_{start}$ denotes an index of a starting radio frame where the narrowband positioning reference signal is located.

4. The method of claim 1, wherein the first narrowband positioning reference signal sequence is scrambled according to the SFN, which comprises:
obtaining a scrambling code T(i) according to the SFN by using a following formula, and scrambling the first narrowband positioning reference signal sequence according to the scrambling code T; wherein the formula is:
in a case where SFN mod M=$\phi$, T(i)=1;
in a case where SFN mod M$\neq\phi$, $$T(i) = \begin{cases} 1, & \text{if } c_{l,n_s}(2i) = 0 \text{ and } c_{l,n_s}(2i+1) = 0 \\ -1, & \text{if } c_{l,n_s}(2i) = 0 \text{ and } c_{l,n_s}(2i+1) = 1 \\ j, & \text{if } c_{l,n_s}(2i) = 1 \text{ and } c_{l,n_s}(2i+1) = 0 \\ -j, & \text{if } c_{l,n_s}(2i) = 1 \text{ and } c_{l,n_s}(2i+1) = 1 \end{cases},$$

wherein a second pseudo random sequence $c_{l,n_s}(x)$ is determined by a third initialization value $c_{init}$, where x denotes 2i or 2i+1, i=0, . . . , $2N_{RB}^{max,DL}-1$, x=0,1, . . . , $4N_{RB}^{max,DL}-1$, $N_{RB}^{max,DL}$ denotes a number of resource blocks (RBs) under a maximum downlink bandwidth, and $\phi$ denotes the first radio frame set.

5. The method of claim 4, wherein the third initialization value $c_{init}$ is:

$c_{init} = \{2^{28}\cdot\lfloor N_{ID}^{NPRS}/512\rfloor+2^{10}\cdot(7\cdot(n_s'+1)+l+1)\cdot(2\cdot$
$(N_{ID}^{NPRS} \text{ mod } 512)+1)+2\cdot(N_{ID}^{NPRS} \text{ mod } 512)+$
$N_{CP}\}\text{mod } 2^{31}$ wherein $n_s' = n_s + 20\cdot\text{SFN}$,
where $N_{CP}$ denotes a type of a cyclic prefix, $N_{ID}^{NPRS}$ denotes an identification of a narrowband positioning reference signal, $n_s$ denotes a slot number in a radio frame, and l denotes an OFDM symbol number in a time slot.

6. The method of claim 1, wherein the first narrowband positioning reference signal sequence is scrambled according to the SFN, which comprises:

obtaining a scrambling code T(i) according to the SFN by using a following formula, and scrambling the first narrowband positioning reference signal sequence according to the scrambling code T; wherein the formula is:

in a case where $0 \leq SFN-SFN_{start} < M$, $T(i)=1$;

in a case where $SFN-SFN_{start} \geq M$, $$T(i) = \begin{cases} 1, & \text{if } c_{l,n_s}(2i) = 0 \text{ and } c_{l,n_s}(2i+1) = 0 \\ -1, & \text{if } c_{l,n_s}(2i) = 0 \text{ and } c_{l,n_s}(2i+1) = 1 \\ j, & \text{if } c_{l,n_s}(2i) = 1 \text{ and } c_{l,n_s}(2i+1) = 0 \\ -j, & \text{if } c_{l,n_s}(2i) = 1 \text{ and } c_{l,n_s}(2i+1) = 1 \end{cases},$$

wherein a second pseudo random sequence $c_{l,n_s}(x)$ is determined by a third initialization value $c_{init}$, where x denotes $2i$ or $2i+1$, $i=0,\ldots,2N_{RB}^{max,DL}-1$, $x=0,1,\ldots,4N_{RB}^{max,DL}-1$, and $N_{RB}^{max,DL}$ denotes a number of RBs under a maximum downlink bandwidth.

7. The method of claim 6, wherein the third initialization value $c_{init}$ is:

$c_{init} = \{2^{28} \cdot \lfloor N_{ID}^{NPRS}/512 \rfloor + 2^{10} \cdot (7 \cdot (n_s'+1)+l+1) \cdot (N_{ID}^{NPRS} \bmod 512)+1)+2 \cdot (N_{ID}^{NPRS} \bmod 512)+ N_{CP}\} \bmod 2^{31}$, wherein $n_s' = n_s + 20 \cdot SFN$;

where $N_{CP}$ denotes a type of a cyclic prefix, $N_{ID}^{NPRS}$ denotes an identification of a narrowband positioning reference signal, $n_s$ denotes a slot number in a radio frame, and l denotes an OFDM symbol number in a time slot.

8. The method of claim 1, before transmitting the first narrowband positioning reference signal on the first radio frame set, further comprising:

obtaining a second initialization value $c_{init}$ by using a following formula, and obtaining the first narrowband positioning reference signal sequence according to the second initialization value $c_{init}$; wherein the formula is:

$c_{init} = 2^{28} \cdot \lfloor N_{ID}^{NPRS}/512 \rfloor + 2^{10} \cdot (7 \cdot (n_s+1)+l+1) \cdot (2 \cdot (N_{ID}^{NPRS} \bmod 512)+1)+2 \cdot (N_{ID}^{NPRS} \bmod 512)+N_{CP}$, where $N_{CP}$ denotes a type of a cyclic prefix, $N_{ID}^{NPRS}$ denotes an identification of a narrowband positioning reference signal, $n_s$ denotes a slot number in a radio frame, and l denotes an OFDM symbol number in a time slot.

9. A signal transmission device, comprising a memory and a processor, wherein the memory is configured to store a computer program about signal transmission and the processor executes the computer program to perform the following steps:

generating a second narrowband positioning reference signal sequence at least according to a system frame number (SFN);

obtaining a second narrowband positioning reference signal according to the second narrowband positioning reference signal sequence; and transmitting a first narrowband positioning reference signal on a first radio frame set, and transmitting the second narrowband positioning reference signal on a second radio frame set;

wherein generating the second narrowband positioning reference signal sequence at least according to the SFN comprises:

$a_{k,l}^{(p)} = r_{l,n_s}((m'+2 \cdot (SFN \bmod M)) \bmod 220)$, where $r_{l,n_s}()$ denotes the first narrowband positioning reference signal sequence, m' denotes a position of a symbol in the sequence $r_{l,n_s}()$, and M denotes a value configured by the base station or a predefined value.

10. A non-transitory computer-readable storage medium, storing a computer program about signal transmission, wherein the computer program is configured to, when executed by at least one processor, cause the at least one processor to perform the following steps:

generating a second narrowband positioning reference signal sequence at least according to a system frame number (SFN);

obtaining a second narrowband positioning reference signal according to the second narrowband positioning reference signal sequence; and transmitting a first narrowband positioning reference signal on a first radio frame set, and transmitting the second narrowband positioning reference signal on a second radio frame set;

wherein generating the second narrowband positioning reference signal sequence at least according to the SFN comprises:

$a_{k,l}^{(p)} = r_{l,n_s}((m'+2 \cdot (SFN \bmod M)) \bmod 220)$, where $r_{l,n_s}()$ denotes the first narrowband positioning reference signal sequence, m' denotes a position of a symbol in the sequence $r_{l,n_s}()$, and M denotes a value configured by the base station or a predefined value.

* * * * *